(12) United States Patent
Jiang et al.

(10) Patent No.: US 11,318,974 B2
(45) Date of Patent: May 3, 2022

(54) ELECTRIC PALLET TRUCK

(71) Applicant: ZHEJIANG JIALIFT WAREHOUSE EQUIPMENT CO., LTD., Zhejiang (CN)

(72) Inventors: Lianjie Jiang, Huzhou (CN); Xiaoxiao Dai, Huzhou (CN); Chunxi Chen, Huzhou (CN)

(73) Assignee: ZHEJIANG JIALIFT WAREHOUSE EQUIPMENT CO., LTD., Huzhou (CN)

( * ) Notice: Subject to any disclaimer, the term of this patent is extended or adjusted under 35 U.S.C. 154(b) by 144 days.

(21) Appl. No.: 15/930,398

(22) Filed: May 12, 2020

(65) Prior Publication Data

US 2020/0385041 A1  Dec. 10, 2020

(30) Foreign Application Priority Data

May 13, 2019 (CN) .......................... 201910391823.4

(51) Int. Cl.
  *B62D 21/14* (2006.01)
  *B62B 3/06* (2006.01)
  *B66F 9/065* (2006.01)

(52) U.S. Cl.
  CPC .......... *B62B 3/0612* (2013.01); *B62B 3/0618* (2013.01); *B62B 3/0625* (2013.01); *B66F 9/065* (2013.01); *B62B 2203/20* (2013.01)

(58) Field of Classification Search
  CPC ................ B62B 3/0612; B62B 3/0618; B62B 3/0625; B62B 3/02; B62B 3/001; B62B 5/004; B62B 5/0043; B62B 5/0053; B62B 5/0033; B62B 5/0059; B62B 5/063; B62B 5/0069; B62B 5/0026; B62B 5/0036; B62B 2203/20; B66F 9/065; B66F 9/075; B66F 9/07572; B66F 9/07531; B66F 9/07527
  See application file for complete search history.

(56) References Cited

U.S. PATENT DOCUMENTS

| | | | | |
|---|---|---|---|---|
| 4,300,867 A * | 11/1981 | Frees | ....................... | B66F 9/195 414/493 |
| 6,260,646 B1 * | 7/2001 | Fernandez | ............ | B62B 3/0612 180/12 |
| 7,040,427 B2 * | 5/2006 | Toomey | ................ | B62B 3/0612 180/19.2 |
| 8,336,654 B1 * | 12/2012 | Licon | .................... | B60K 17/043 180/65.6 |
| 8,356,688 B2 * | 1/2013 | Passeri | ....................... | B62B 5/06 180/326 |

(Continued)

FOREIGN PATENT DOCUMENTS

CN  104210517 A  12/2014

*Primary Examiner* — James M Dolak
(74) *Attorney, Agent, or Firm* — Metis IP LLC

(57) ABSTRACT

The present disclosure is related to an electric pallet truck. The electric pallet truck includes a frame, a lifting unit, and a walking unit. The lifting unit is configured to adjust a height of the frame. The walking unit is configured to drive the frame to move. The lifting unit includes a lifting mechanism fixedly connected to the frame and a hydraulic mechanism configured to control a lifting of the lifting mechanism. The walking unit includes a driving mechanism configured at a bottom of the lifting mechanism.

16 Claims, 8 Drawing Sheets

(56) References Cited

U.S. PATENT DOCUMENTS

| | | | | |
|---|---|---|---|---|
| 8,360,443 B2* | 1/2013 | Ellington | .............. | B62B 3/0618 |
| | | | | 280/43.23 |
| 8,540,213 B2* | 9/2013 | Feiquan | .................... | B66F 9/22 |
| | | | | 254/2 R |
| 8,668,208 B2* | 3/2014 | Larringan Errasti | ..... | B62B 3/06 |
| | | | | 280/43.23 |
| 9,586,605 B2* | 3/2017 | He | ......................... | B62B 3/0612 |
| 9,623,891 B2* | 4/2017 | Newell | ................. | B62B 3/0612 |
| 9,963,330 B2* | 5/2018 | Huether | ................ | B62B 3/0606 |
| 9,966,712 B1* | 5/2018 | Hongpeng | .............. | H01R 13/10 |
| 10,040,674 B2* | 8/2018 | Xu | ..................... | B65D 19/0018 |
| 10,093,336 B2* | 10/2018 | Pan | ........................ | B62B 5/0053 |
| 10,730,728 B1* | 8/2020 | Qichen | .................... | B66F 9/24 |
| 11,034,371 B2* | 6/2021 | Kalinowski | ............ | B62B 3/0643 |
| 11,180,172 B2* | 11/2021 | Yahner | .................... | B66F 9/061 |
| 11,214,471 B2* | 1/2022 | Rusche | .................... | B62B 5/04 |

* cited by examiner

ELECTRIC PALLET TRUCK

CROSS-REFERENCE TO RELATED APPLICATIONS

This application claims priority of Chinese Patent Application No. 201910391823.4, filed on May 13, 2019, the contents of which are hereby incorporated by reference.

TECHNICAL FIELD

This disclosure generally relates to a pallet truck, and more particularly, relates to an electric pallet truck.

BACKGROUND

A pallet truck is a tool used to transport pallets or goods. The operation of the pallet truck is simple, and the movement of the pallet truck is flexible. However, due to the increasing requirements for space utilization, the pallet truck is required to reduce size while ensuring strong power. Thus, it is desirable to provide a pallet truck with a compact structure.

SUMMARY

According to an aspect of the present disclosure, an electric pallet truck may include a frame 1, a lifting unit 2 configured to adjust a height of the frame 1, and a walking unit 5 configured to drive the frame 1 to move. The lifting unit 2 may include a lifting mechanism 21 fixedly connected to the frame 1 and a hydraulic mechanism 22 configured to control a lifting of the lifting mechanism 21. The walking unit 5 may include a driving mechanism 51 configured at a bottom of the lifting mechanism 21.

In some embodiments, the electric pallet truck may include a power supply unit 7 configured on an end of the frame 1. The power supply unit 7 may be configured to supply a power to at least one of the hydraulic mechanism 22 or the driving mechanism 51.

In some embodiments, the hydraulic mechanism 22 may be configured on the end of the frame 1. The hydraulic mechanism 22 may be located on a same side of the power supply unit 7.

In some embodiments, the power supply unit 7 may include a power connector 71 and a box battery 73 connected to the power connector 71. A connection between the power connector 71 and the box battery 73 may be a quick-plug type.

In some embodiments, the frame 1 may be provided with a mounting part configured to fix the power connector 71. The power connector 71 may be provided with a plug component 72. The box battery 73 may be provided with a power supply port. The movement of the box battery 73 relative to the power connector 71 along a first direction may realize a connection and a separation between the plug component 72 and the power supply port.

In some embodiments, the mounting part may include a mounting groove 111 configured on a plate 11 of the frame 1.

In some embodiments, the lifting mechanism 21 may include a bearing component 211 and a cylinder seat 212 fixed on the bearing component 211. An end of a piston rod 213 on the cylinder seat 212 may be fixedly connected to the frame 1.

In some embodiments, the hydraulic mechanism 22 may include an oil tank 221 configured on the frame 1, a valve group 222 configured on the oil tank 221, a first motor 223 configured on the valve group 222 configured to control the valve group 222, and a relay 224 configured on a side of the first motor 223. The valve group 222 may be connected to the piston rod 213 through a lifting oil pipe 225.

In some embodiments, the electric pallet truck may include a link unit 4 connected with the frame 1 and the lifting unit 2. The link unit 4 may include a support shaft 41 fixedly configured on the frame 1, a first rib 42 and a second rib 43 rotatably configured on the support shaft 41. A first end of the first rib 42 may be connected with the lifting unit 2. A first end of the second rib 43 may be connected with the frame 1.

In some embodiments, a second end of the first rib 42 may be rotatably connected with the bearing component 211 of the lifting mechanism 21. A second end of the second rib 43 may be rotatably connected with a push rod 44 of the frame 1.

In some embodiments, the first rib 42 may be connected with the second rib 43 through a spacer 45.

In some embodiments, the driving mechanism 51 may include a gear transmission unit and a gear box 511 configured to accommodate the gear transmission unit. The lifting mechanism 21 may include the bearing component 211. The gear box 511 may be located at a bottom of the bearing component 211.

In some embodiments, the gear transmission unit may include a second motor 512 fixed on the gear box 511, a drive gear 514 rotatably connected with the second motor 512, and a gear sleeve 516 rotatably connected with the drive gear 514. The gear sleeve 516 may be fixedly connected with a driving wheel 517. A rotation of the second motor 512 may drive a rotation of the drive gear 514 and a rotation of the gear sleeve 516.

In some embodiments, the gear transmission unit may include a shaft gear 515 configured between the drive gear 514 and the gear sleeve 516. The shaft gear 515 may be coaxially configured with the drive gear 514 and meshes with the gear sleeve 516.

In some embodiments, the gear transmission unit may include a pinion gear 513 configured between the second motor 512 and the drive gear 514. The pinion gear 513 may be sleeved on a motor shaft 5121 of the second motor 512 and meshes with the drive gear 514.

In some embodiments, the electric pallet truck may include a control unit 6 connected with the driving mechanism 51. An accelerator 62 may be configured on an operating rod 61 of the control unit 6. The accelerator 62 may be configured to adjust a rotation rate of the second motor 512.

In some embodiments, a side of the power supply unit 7 may be provided with a baffle 3. The baffle 3 may be fixedly installed on the frame 1. The end of the piston rod 213 may be fixedly connected with the baffle 3.

In some embodiments, the frame 1 may include a plate 11. The baffle 3 may be fixedly configured on the plate 11.

In some embodiments, a side of the baffle 3 may be provided with a first cover 8. The first cover 8 may be fixed on the frame 1. A side of the driving mechanism 51 may be provided with a second cover 9.

In some embodiments, the electric pallet truck may include a switch 31. The switch 31 may be provided on at least one of the baffle 3, the piston rod 213, or the first cover 8.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
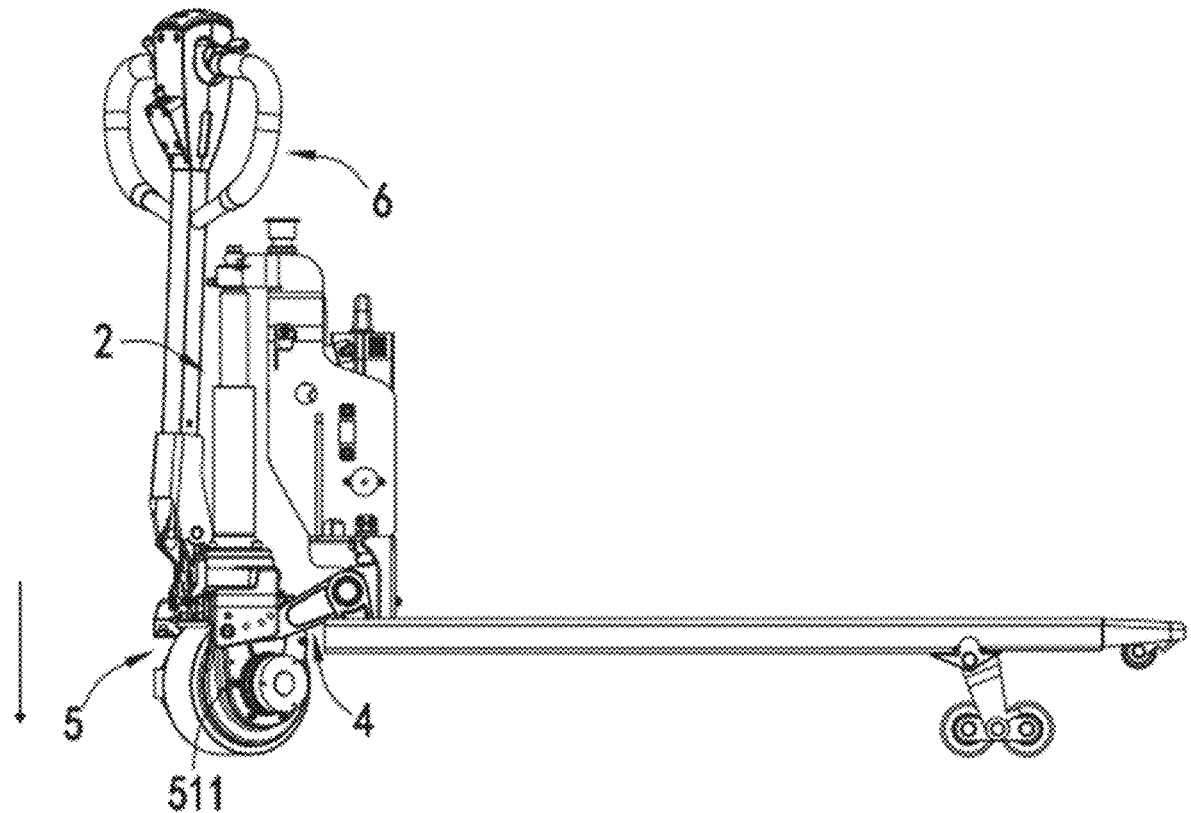
FIG. 1 is a side view of an electric pallet truck according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the terms "hole," "surface," "groove," "ring," etc., when used in this disclosure, refer to one or more parts with one or more specific purposes. However, a structure that may perform a same or similar function compared to a part exemplified above or referred to elsewhere in the present disclosure may be named differently from the present disclosure.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In some scenarios, the requirements for space utilization may be become higher and higher. For example, the pallet truck may be required to be as small as possible while ensuring strong power. A manual hydraulic pallet truck may be mainly used to carry pallets or goods. The operation of the manual hydraulic pallet truck may be simple and the movement of the manual hydraulic pallet truck may be flexible. However, the pushing and pulling of the manual hydraulic pallet truck may be realized by manpower, which is labor-intensive. When the ground is uneven, the use efficiency of the manual hydraulic pallet truck may be relatively low.

In some scenarios, a full-electric pallet truck may be a relatively time-saving and labor-saving transportation tool. However, the size of the full-electric pallet truck may be relatively large, and it may need to be equipped with a professional driver. Furthermore, the full-electric pallet truck may have a plurality of complicated components, which may be difficult to maintain and/or repair.

In some embodiments, a full-electric pallet truck may optimize the body structure on the basis of ensuring strength and stability. The components of the all-electric pallet truck may be reduced. The quality of the full-electric pallet truck may be reduced. The operation of the full-electric pallet truck may be easy. A direct current electrical system may be used in the full-electric pallet truck, and a direct current permanent magnet motor may be equipped in the full-electric pallet truck, which may ensure a strong power, reduce the energy consumption, and improve the work efficiency. The plurality of components of the full-electric pallet truck may be modularized, which may simplify the assembly and maintenance of the full-electric pallet truck. However, the driving force and the layout of the power supply equipment may be not reasonable, which may lead to a long line, a uncompact structure, an inconvenient installation and maintenance of the power supply equipment, and an inconvenient control of the body of the full-electric pallet truck.

Based on the above problems, an electric pallet truck may be provided in the present disclosure. A driving mechanism of the electric pallet truck may be arranged as a whole component at the bottom of a lifting mechanism. The transmission of a gear and the gear sleeve may drive a driving wheel to rotate around the outer side of a second motor. A power supply unit may be set as a quick-plug type (also referred to as a plug-in type). A box battery may be easy to assemble and/or disassemble. The configuration of the driving mechanism of the pallet truck may be reasonable, and the size of the pallet truck may be reduced. The structure of the pallet truck may be compact, the battery may be convenient to charge, and the power supply line may be shortened.

Figure 2:
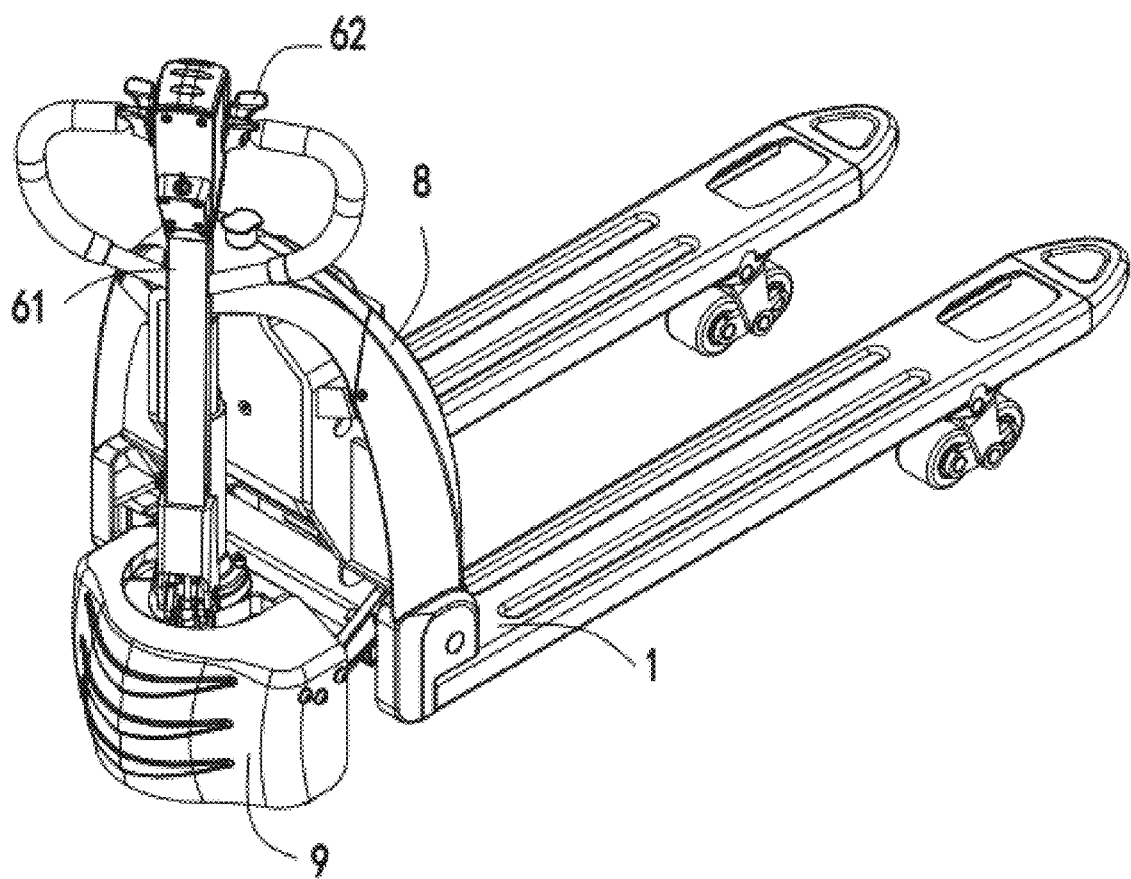
FIG. 2 is a schematic diagram illustrating a structure of an electric pallet truck according to some embodiments of the present disclosure.

FIG. 1 is a side view of an electric pallet truck according to some embodiments of the present disclosure. FIG. 2 is a schematic diagram illustrating a structure of an electric pallet truck according to some embodiments of the present disclosure. As shown in FIG. 1 and FIG. 2, in some embodiments, an electric pallet truck may include a frame 1, a lifting unit 2 configured to adjust a height of the frame 1, and a walking unit 5 configured to drive the frame 1 to move. The lifting unit 2 may include a lifting mechanism 21 fixedly connected to the frame 1, and a hydraulic mechanism 22 configured to control the lifting of the lifting mechanism 21. An end of the lifting mechanism 21 may be fixedly connected to the frame 1. The walking unit 5 may include a driving mechanism 51 configured at a bottom of the lifting mechanism 21.

Specifically, the frame 1 may be configured to carry pallets or goods. For example, if the goods are not easy to load directly on the frame 1, the goods may be placed on the pallet for transportation. In some embodiments, the frame 1 may have a long plate shape, as shown in FIG. 2. In some embodiments, the frame 1 may have other shapes, for example, a long strip shape, a column shape, a mesh shape, or the like. The lifting unit 2 may be configured to adjust the height of the frame 1. For example, the lifting unit 2 may adjust the height of the frame 1 for unloading or loading the goods.

The walking unit 5 may make the frame 1 moveable. The frame 1 may be moved under the drive of the driving mechanism 51. The walking unit 5 may include the driving mechanism 51 configured at a bottom of the lifting mechanism 21. The bottom of the lifting mechanism 21 may refer to a portion of the lifting mechanism 21 close to the ground when the electric transport vehicle is placed in the way shown in FIG. 1 or FIG. 2 (as indicated by the arrow shown in FIG. 1). In some embodiments, the bottom of the lifting mechanism 21 may refer to a side of the bearing component 211 away from the piston rod 213. In some embodiments, the driving mechanism 51 may be configured directly below the lifting mechanism 21, or may be configured below the lifting mechanism 21 to the left, right, front (i.e., the side of the lifting mechanism 21 away from the front end of the frame 1), or back (i.e., the side of the lifting mechanism 21 close to the front end of the frame 1). In some embodiments, by arranging the driving mechanism 51 below the lifting mechanism 21, the overall volume of the electric truck may be reduced to a certain extent, so that the structure of the electric truck may be relatively compact, and the space utilization rate may be improved.

Figure 3:
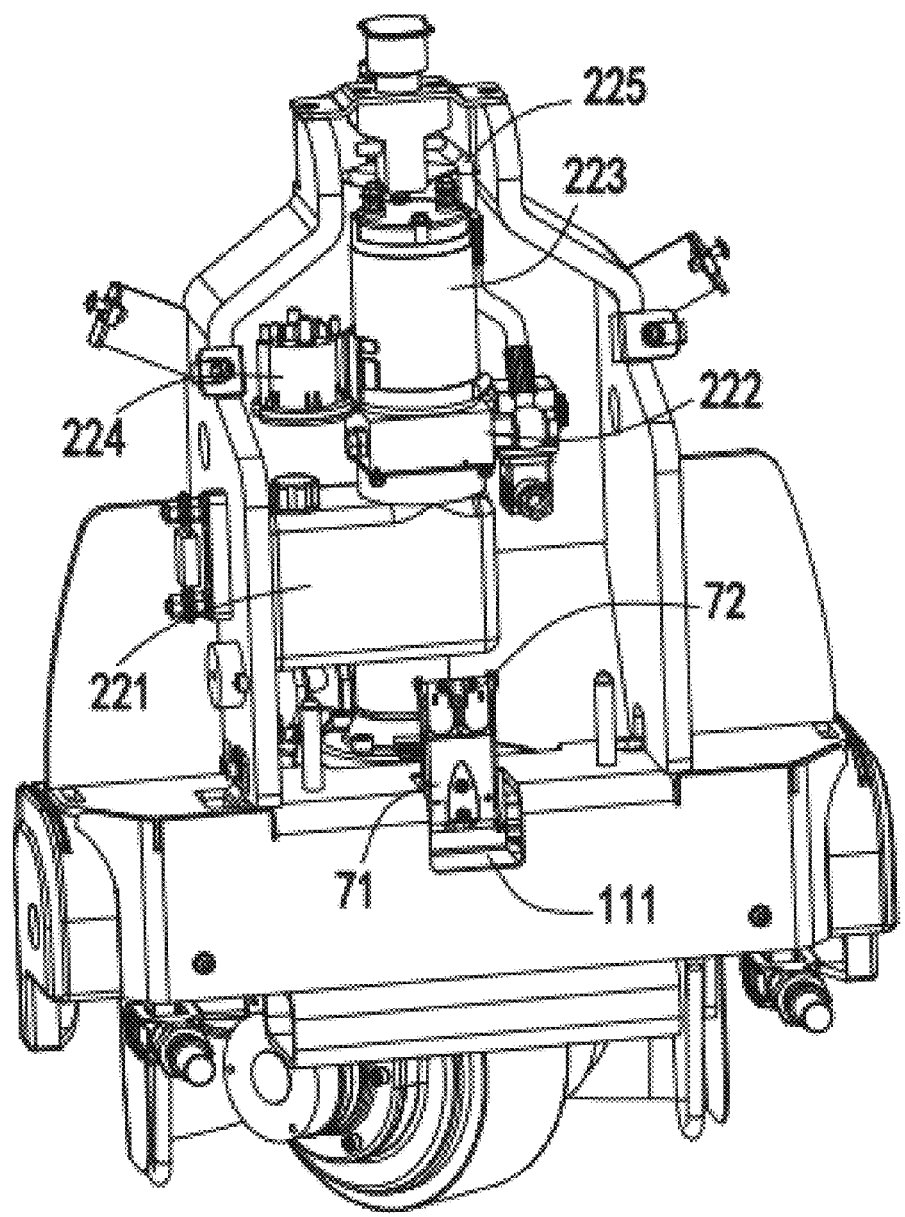
FIG. 3 is a schematic diagram illustrating a partial structure of a lifting unit according to some embodiments of the present disclosure.

FIG. 3 is a schematic diagram illustrating a partial structure of a lifting unit according to some embodiments of the present disclosure. In some embodiments, the electric pallet truck may further include a power supply unit 7 configured on an end (e.g., a rear end) of the frame 1. The power supply unit 7 may be configured to supply the power to the hydraulic mechanism 22 and/or the driving mechanism 51. The rear end of the frame 1 may refer to an end of the frame 1 close to the driving mechanism 51, and the front end of the frame 1 may refer to an end of the frame 1 away from the driving mechanism 51.

In some embodiments, the hydraulic mechanism 22 may be configured on an end (e.g., the rear end) of the frame 1 and located on the same side of the power supply unit 7. Since the hydraulic mechanism 22 and the power supply unit 7 are located at the same side, the relative positions of the hydraulic mechanism 22 and the power supply unit 7 may be relatively compact, and the power supply line may be shortened.

As shown in FIG. 3, in some embodiments, the power supply unit 7 may include a power connector 71 and a box battery 73 connected to the power connector 71. The connection between the power connector 71 and the box battery 73 may be a quick-plug type. The quick-plug type may refer to that two components are connected or separated by plugging and unplugging the two components. For example, the connection between a plug and a socket may be the quick-plug type. The quick-plug type connection and/or separation may be simple and convenient. By setting the power supply unit 7 as the quick-plug type, the box battery 73 of the electric pallet truck may be convenient for disassembly and/or assembly. When the box battery 73 is empty, the box battery 73 may be quickly removed and charged without moving the electric pallet truck to a charging position for charging. The use efficiency of the electric pallet truck may be improved.

Figure 8:
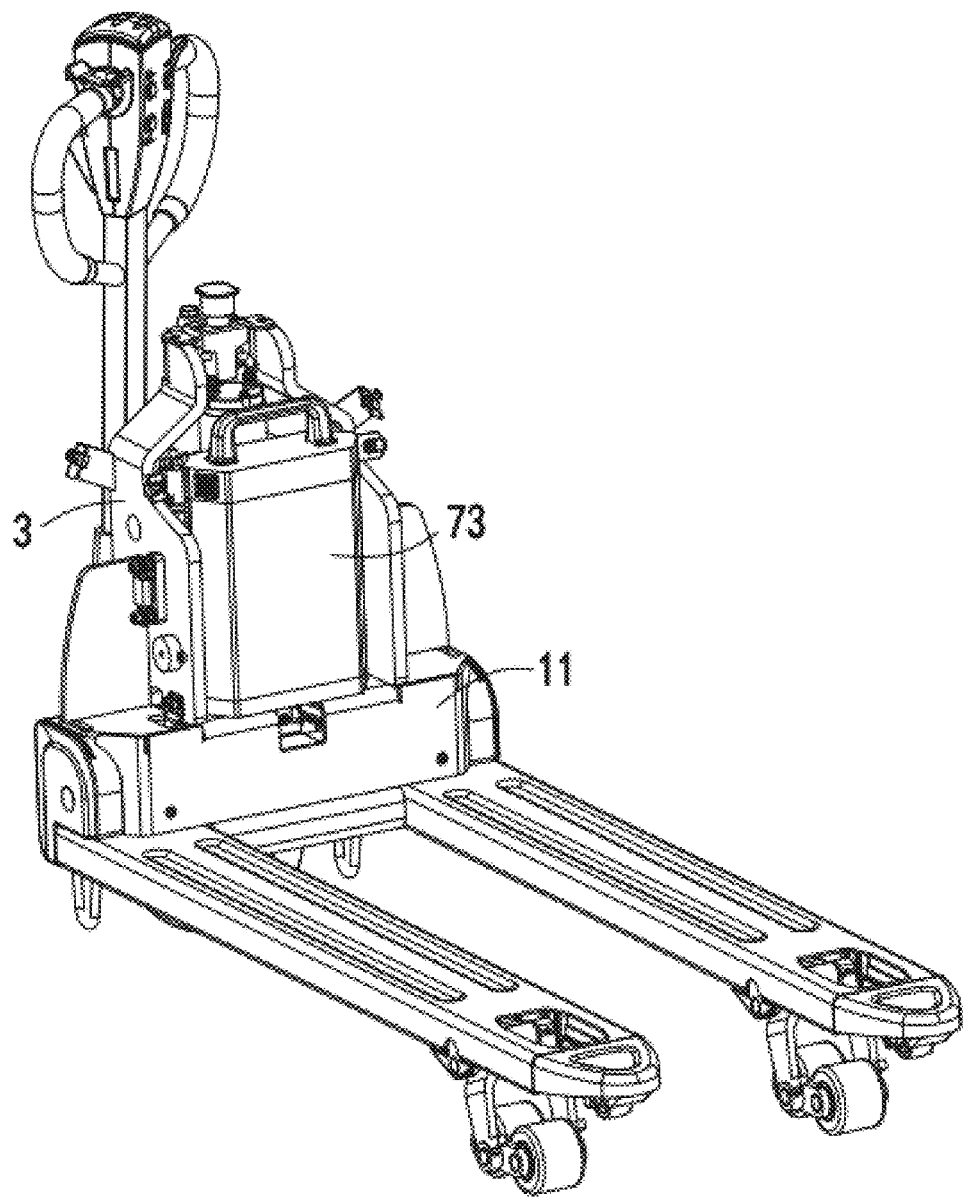
FIG. 8 is a schematic diagram illustrating a structure of a power supply unit according to some embodiments of the present disclosure.

In some embodiments, the frame 1 may be provided with a mounting part configured to fix the power connector 71. The power connector 71 may be provided with a plug component 72. The box battery 73 may be provided with a power supply port. The movement of the box battery 73 relative to the power connector 71 along a first direction may realize a connection and a separation between the plug component 72 and the power supply port. The first direction may refer to a plugging and unplugging direction when the plug component 72 is connected with or separated from the power supply port. For example, when the box battery 73 is connected with or separated from the power connector 71 in the way as illustrated in FIG. 1 or FIG. 8, the first direction may be a vertical direction (e.g., the direction of the arrow shown in FIG. 1). In some embodiments, the plugging and unplugging direction may be a horizontal direction, for example, the power connector 71 shown in FIG. 1 or FIG. 8 may be placed horizontally, and at this time, the box battery 73 may be connected with or separate from the power connector 71 along the horizontal direction.

In some embodiments, the mounting part may include a mounting groove 111 configured on a plate 11 of the frame 1. The mounting groove 111 may be configured to fix the power connector 71.

As shown in FIG. 3, in some embodiments, the hydraulic mechanism 22 may include an oil tank 221 configured on the frame 1, a valve group 222 configured on the oil tank 221, a first motor 223 configured on the valve group 222 configured to control the valve group 222, and a relay 224 configured on a side of the first motor 223. The valve group 222 may be connected to the piston rod 213 through a lifting oil pipe 225. The oil tank 221 may be configured to store the hydraulic oil. The lifting oil pipe 225 may be configured to transport the hydraulic oil to the piston rod 213 and other components of the lifting mechanism 21.

Figure 4:
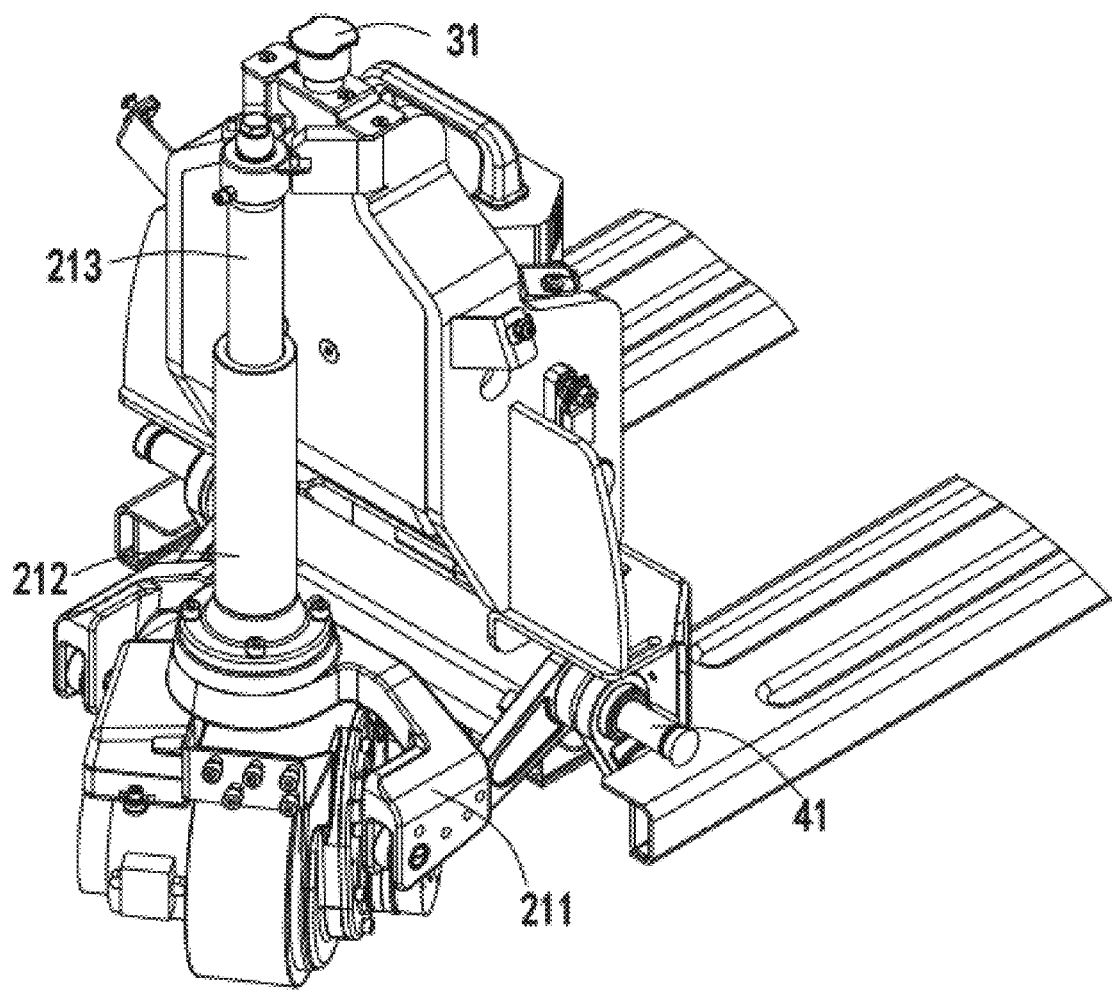
FIG. 4 is a schematic diagram illustrating a structure of a lifting mechanism according to some embodiments of the present disclosure.

FIG. 4 is a schematic diagram illustrating a structure of a lifting mechanism according to some embodiments of the present disclosure. As shown in FIG. 4, in some embodiments, the lifting mechanism 21 may include a bearing component 211 and a cylinder seat 212 fixed on the bearing component 211. An upper end of a piston rod 213 on the cylinder seat 212 may be fixedly connected to the frame 1.

By fixedly connecting the piston rod 213 to the frame 1, the operator may adjust the height of the frame 1 by controlling the lifting movement of the piston rod 213. In addition, the piston rod 213 of the lifting mechanism 21 may be fixedly connected to the frame, which may effectively shorten the line of the lifting oil pipe 225 between the hydraulic mechanism 22 and the lifting mechanism 21.

Figure 7:
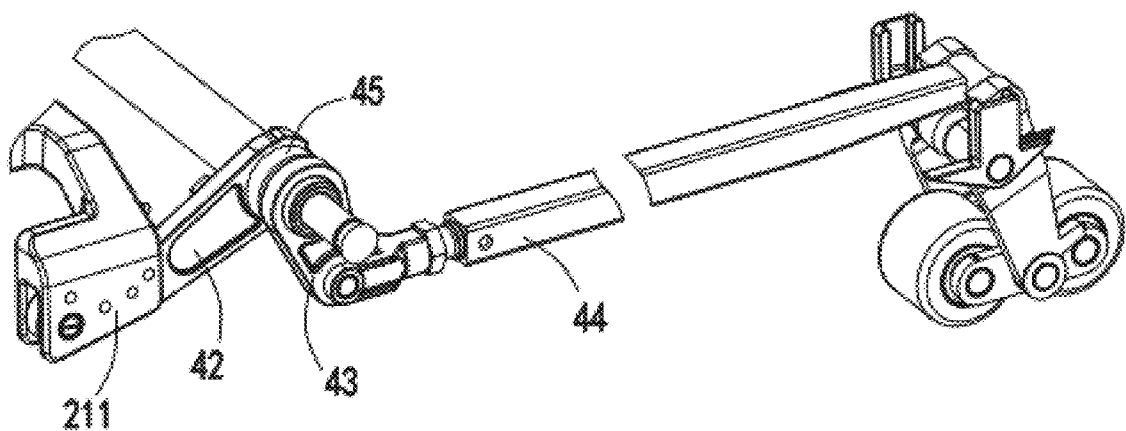
FIG. 7 is a schematic diagram illustrating a structure of a link unit according to some embodiments of the present disclosure.

FIG. 7 is a schematic diagram illustrating a structure of a link unit according to some embodiments of the present disclosure. As shown in FIG. 7, in some embodiments, the electric pallet truck may further include a link unit 4 connected with the frame 1 and the lifting unit 2. The link unit 4 may include a support shaft 41 fixedly configured on the frame 1, a first rib 42 and a second rib 43 rotatably configured on the support shaft 41. A first end of the first rib 42 may be connected with the lifting unit 2, and a first end of the second rib 43 may be connected with the frame 1.

In some embodiments, a second end of the first rib 42 may be rotatably connected with the bearing component 211 of the lifting mechanism 21. A second end of the second rib 43 may be rotatably connected with a push rod 44 of the frame 1. In some embodiments, the second rib 43 may be connected to other parts of the frame 1, which is not limited in this disclosure.

When the height of the frame 1 is adjusted, the piston rod 213 may drive the support shaft 41 up and down. Since the first end of the first rib 42 is rotatably connected with support shaft 41, and the second end of the first rib 42 is rotatably connected with the bearing component 211, the lifting of the support shaft 41 may not affect the height of the driving mechanism 51.

In some embodiments, the first rib 42 may be connected with the second rib 43 through a spacer 45. In some embodiments, the first rib 42 and the second rib 43 may be fixedly connected by the spacer 45. The clearance and preload at the connection between the first rib 42 and support shaft 41, and the connection between the second rib 43 and support shaft 41 may be adjusted to reduce the wear of the support shaft 41. In some embodiments, the spacer may include but is not limited to a gasket, a backup ring, or the like. In some embodiments, the first rib 42 and the second rib 43 may be rotated relatively.

Figure 5:
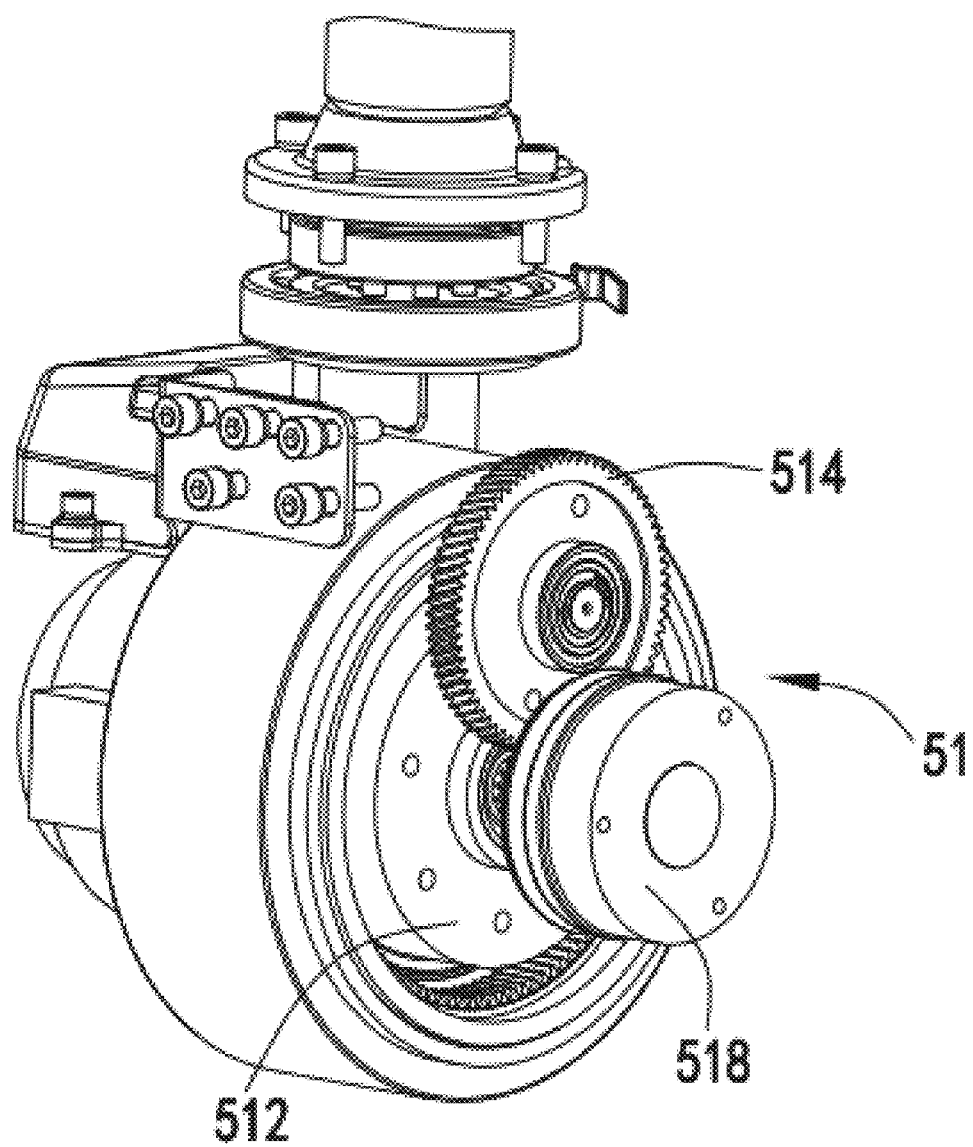
FIG. 5 is a structural diagram illustrating a partial structure of a driving mechanism according to some embodiments of the present disclosure.
Figure 6:
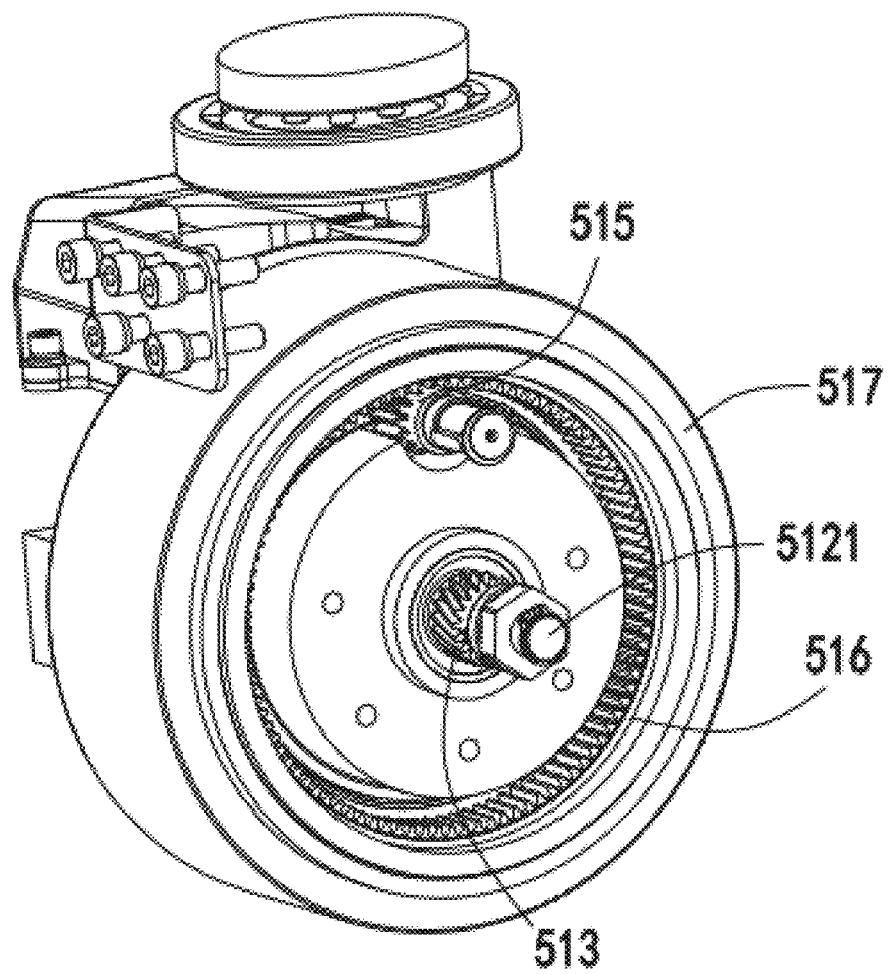
FIG. 6 is a schematic diagram illustrating an internal structure of a driving mechanism according to some embodiments of the present disclosure.

FIG. 5 is a structural diagram illustrating a partial structure of a driving mechanism according to some embodiments of the present disclosure. FIG. 6 is a schematic diagram illustrating an internal structure of a driving mechanism according to some embodiments of the present disclosure. As shown in FIG. 5 and FIG. 6, in some embodiments, the driving mechanism 51 may include a gear transmission unit and a gear box 511 configured to accommodate the gear transmission unit. The lifting mechanism 21 may include the bearing component 211. The gear box 511 may be located at a bottom of the bearing component 211. The bottom of the bearing component 211 may refer to a side of the bearing component 211 close to the ground when the electric truck is placed in the way shown in FIG. 1 or FIG. 2. In some embodiments, the driving mechanism 51 may be configured directly below the bearing component 211, or may be configured at a left, right, front, or back position of the bottom of the bearing component 211. By providing the entire driving mechanism 51 at the bottom of the bearing component 211, the overall volume of the pallet truck may be reduced to a certain extent, the structure of the pallet truck may be relatively compact, and the space utilization rate may be improved.

In some embodiments, the gear transmission unit may include a second motor 512 fixed on the gear box 511, a drive gear 514 rotatably connected with the second motor 512, a gear sleeve 516 rotatably connected with the drive gear 514. The gear sleeve 516 may be fixedly connected with a driving wheel 517. The rotation of the second motor 512 may drive the rotation of the drive gear 514 and the rotation of the gear sleeve 516.

As shown in FIG. 5 and FIG. 6, in some embodiments, the gear transmission unit may further include a shaft gear 515 configured between the drive gear 514 and the gear sleeve 516. The shaft gear 515 may be coaxially configured with the drive gear 514 and may mesh with the gear sleeve 516.

In some embodiments, the gear transmission unit may further include a pinion gear 513 configured between the second motor 512 and the drive gear 514. The pinion gear 513 may be sleeved on a motor shaft 5121 of the second motor 512 and may mesh with the drive gear 514.

In the present disclosure, the transmission of the gear (e.g., the drive gear 514, the pinion gear 513) and the gear sleeve 516 may be utilized to drive the driving wheel 517 to rotate around the outer side of the second motor 512 to realize the movement of the electric pallet truck. Specifically, the second motor 512 may start to work under the control of the control unit 6, then the pinion gear 513 may be driven to rotate. Since the drive gear 514 meshes with the pinion gear 513, the drive gear 514 may also rotate synchronously. At this time, the gear sleeve 516 that meshes with the drive gear 514 through the shaft gear 515 may follow the drive gear 514 to rotate, and finally driving wheel 517 may be driven to rotate to realize the movement of the electric pallet truck. This driving way may effectively reduce the overall volume of the driving mechanism 51, improve the space utilization rate, and make the structure of the electric pallet truck compact.

In some embodiments, in addition to the gear transmission, the driving mechanism 51 may adopt other transmission forms, for example, a ratchet transmission, a worm gear transmission, a crankshaft connecting rod transmission, or the like.

As shown in FIG. 5, in some embodiments, an end of the motor shaft 5121 of the second motor 512 may be provided with a brake disc 518. The operator may break the electric pallet truck through the brake disc 518. For example, the operator may control a brake caliper to catch the brake disc 518 to generate a braking force to achieve the braking of the electric pallet truck.

As shown in FIG. 2, in some embodiments, the electric pallet truck may further include a control unit 6 connected with the driving mechanism 51. An accelerator 62 may be configured on an operating rod 61 of the control unit 6. The accelerator 62 may be configured to adjust a rotation rate of the second motor 512. The operator may adjust the rotation speed of the second motor 512 through the accelerator 62 to achieve the acceleration or deceleration of the electric pallet truck. The rotation rate may refer to the rotation acceleration of the second motor. The rotation rate may indicate the change amount of the rotation speed of the second motor. A higher rotation rate of the second motor may correspond to a greater change amount of the rotation speed of the driving wheel 517, and a greater change amount of the movement speed of the electric truck. In some embodiments, the rotation rate may refer to the rotation speed of the second motor 512. A higher rotation rate of the second motor may correspond to a higher rotation speed of the driving wheel 517, and a higher movement speed of the electric truck. Accordingly, the rotation speed of the driving wheel 517 may be adjusted through the accelerator. In some embodiments, the accelerator 62 may be configured on the operating rod 61 in a knob type, a push button type, a scroll wheel type, a key type, or the like, or any combination thereof.

FIG. 8 is a schematic diagram illustrating a structure of a power supply unit according to some embodiments of the present disclosure. As shown in FIG. 2, FIG. 3, FIG. 4 and FIG. 8, in some embodiments, a side of the power supply unit 7 may be provided with a baffle 3. The baffle 3 may be fixedly installed on the frame 1. An end (e.g., the upper end) of the piston rod 213 may be fixedly connected with the baffle 3. In some embodiments, the piston rod 213 of the lifting mechanism 21 may be fixedly connected to the frame 1 through the baffle 3, which may shorten the line of a lifting oil pipe 225 between the hydraulic mechanism 22 and the lifting mechanism 21.

In some embodiments, the frame 1 may include the plate 11. The baffle 3 may be fixedly configured on the plate 11. In some embodiments, the baffle 3 may not be configured on the plate 11, and the baffle 3 may be fixedly installed on other positions of the frame 1.

In some embodiments, a side (e.g., an outer side) of the baffle 3 may be provided with a first cover 8 fixed on the frame 1. The power supply unit 7 and the hydraulic mechanism 22 may be enclosed by the first cover 8, and isolated from the external environment, which may effectively prevent dust from entering, extend the service life, and make the structure of the electric pallet truck coordinated and compact.

As shown in FIG. 4, in some embodiments, the electric pallet truck may further include a switch 31. The switch 31 may be provided on at least one of the baffle 3, the piston rod 213, or the first cover 8. The operator may use the switch 31 to make an emergency stop for the electric pallet truck while driving to avoid an accident.

As shown in FIG. 2, in some embodiments, a side (e.g., an outer side) of the driving mechanism 51 may be provided with a second cover 9. By providing a second cover 9 on the outer side of the driving mechanism 51, dust may be prevented from entering the internal of the driving mechanism 51 (e.g., the second motor 512, the pinion gear 513, etc.) during working, which may extend the service life of the driving mechanism 51.

As shown in FIGS. 1, 2 and 3, in some embodiments, the electric pallet truck may include a frame 1, a lifting unit 2, a link unit 4 connected with the frame 1 and the lifting unit 2, a walking unit 5, a control unit 6, and a power supply unit 7. The lifting unit 2 may include a lifting mechanism 21 fixedly connected to the frame 1, and a hydraulic mechanism 22 configured to control a lifting of the lifting mechanism 21. The walking unit 5 may include a driving mechanism 51 configured at a bottom of the lifting mechanism 21. The power supply unit 7 may be configured on a rear end of the frame 1. The power supply unit 7 may be configured to supply a power to the hydraulic mechanism 22 and/or the driving mechanism 51. The hydraulic mechanism 22 may be configured on the rear end of the frame 1 and located on a same side of the power supply unit 7. The control unit 6 may be connected with the driving mechanism 51. In some embodiments, by arranging the entire driving mechanism 51 below the lifting mechanism 21, the overall volume of the electric pallet truck may be reduced to a certain extent, so that the structure of the electric pallet truck may be compact, and the space utilization rate may be improved.

In some embodiments, the power supply unit 7 may be set as a quick-plug type. The quick-plug type may refer to that two components are connected or separated by plugging and unplugging the two components. For example, the connection between a plug and a socket may be the quick-plug type. The quick-plug type connection and/or separation may be simple and convenient.

In some embodiments, the plate 11 of the frame 1 may be provided with a mounting groove 111. The power supply unit 7 may include a power connector 71 configured in the mounting groove 111. The upper end of the power connector 71 may be provided with a plug component 72. The power supply unit 7 may further include the box battery 73. The plug component 72 may connect with the power supply port under the box battery 73 when the box battery 73 is installed vertically downward. The mounting groove 111 may be configured to fix the power connector 71.

By setting the power supply unit 7 as the plug-in type, the box battery 73 may be easily disassembled and assembled. The battery may be taken out for charging when there is no power, without moving the whole electric pallet truck to the charging position for charging. In addition, by setting the hydraulic mechanism 22 on the side of the power supply unit 7, the relative positions of the two components may be compact, and the power supply line may be shortened.

As shown in FIG. 4, in some embodiments, the lifting mechanism 21 may include a bearing component 211 and a cylinder seat 212 fixed on the bearing component 211. The upper end of the piston rod 213 of the cylinder seat 212 may be fixedly connected to the frame 1.

In some embodiments, the hydraulic mechanism 22 may include an oil tank 221, a valve group 222 configured on the oil tank 221, a first motor 223 configured on the valve group 222 configured to control the operation of the valve group 222, and a relay 224 configured on the side of the first motor 223. The valve group 222 may be connected to the piston rod 213 through a lifting oil pipe 225.

In some embodiments, the piston rod 212 of the lifting mechanism 21 may be fixedly connected to the frame 1, which may shorten the line of the lifting oil pipe 225 between the hydraulic mechanism 22 and the lifting mechanism 21. The structure layout may be reasonable, and the overall structure of the electric pallet truck may be compact and coordinated.

As shown in FIG. 7, in some embodiments, the link unit 4 may include a support shaft 41 fixedly configured on the frame 1, a first rib 42 and a second rib 43 rotatably configured on the support shaft 41, and a push rod connected with the second rib 43. An end of the push rod 44 may be rotatably connected with an end of the second rib 43. The first rib 42 and the second rib 43 may be fixedly connected by a spacer 45. The end of the first rib 42 may be rotatably connected to the bearing component 211. In some embodiments, the second rib 43 may be connected to the frame 1. When the height of the frame 1 is adjusted, the piston rod 213 may drive the support shaft 41 up and down. Since the first end of the first rib 42 are rotatably connected with support shaft 41, and the second end of the first rib 42 is rotatably connected with the bearing component 211, the lifting of the support shaft 41 may not affect the height of the driving mechanism 51 (e.g., the driving wheel 517).

In some embodiments, the first rib 42 and the second rib 43 may be relatively fixed. In some embodiments, the first rib 42 and the second rib 43 may be fixedly connected by the spacer 45. The clearance and preload at the connection between the first rib 42 and the support shaft 41, and the connection between the second rib 43 and the support shaft 41 may be adjusted, which may reduce the wear of the support shaft 41. In some embodiments, the spacer may include but is not limited to a gasket, a backup ring, or the like. In some embodiments, the first rib 42 and the second rib 43 may be rotated relatively.

As shown in FIG. 5 and FIG. 6, in some embodiments, the driving mechanism 51 may include a gear transmission unit and a gear box 511 configured to accommodate the gear transmission unit. The lifting mechanism 21 may include the bearing component 211. The gear box 511 may be located at a bottom of the bearing component 211. The bottom of the bearing component 211 may refer to a side of the bearing component 211 close to the ground when the electric truck is placed in the way shown in FIG. 1 or FIG. 2. In some embodiments, the driving mechanism 51 may be configured directly below the bearing component 211, or may be configured at a left, right, front, or back position of the bottom of the bearing component 211. By configuring the entire driving mechanism 51 at the bottom of the bearing component 211, the overall volume of the pallet truck may be reduced to a certain extent, the structure of the pallet truck may be relatively compact, and the space utilization rate may be improved.

In some embodiments, the driving mechanism 51 may include a gear box 511 rotatably configured at the bottom of the bearing component 211, a second motor 512 fixed on the gear box 511, and a rotatable pinion gear 513 driven by the second motor 512, a drive gear 514 rotatably configured on the gear box 511 and meshed with the pinion gear 513, a shaft gear 515 coaxially and fixedly connected to the drive gear 514, and a gear sleeve 516 rotatably configured on a housing of the second motor 512. The shaft gear 515 may mesh with the gear sleeve 516. The driving wheel 517 may be fixedly sleeved on the outer side of the gear sleeve 516. The end of the motor shaft 5121 of the second motor 512 may be provided with a brake disc 518. The operator may control the electric pallet truck to break through the brake disc 518. For example, the operator may control a brake caliper to catch the brake disc 518 to generate a braking force to achieve the braking of the electric pallet truck. The entire driving mechanism 51 may be set below the lifting mechanism 21, and the transmission of the gear and the gear sleeve 516 may be utilized to drive the driving wheel 517 to rotate around the outer side of the second motor 512. This driving way may effectively reduce the overall volume of the driving mechanism 51, which may improve the space utilization rate, and make the structure of the electric pallet truck compact.

In some embodiments, in addition to the gear transmission, the driving mechanism 51 may also adopt other transmission forms, for example, a ratchet transmission, a worm gear transmission, a crankshaft connecting rod transmission, or the like.

In some embodiments, as shown in FIG. 4, a side of the power supply unit 7 may be provided with the baffle 3. The baffle 3 may be fixedly installed on the plate 11. The upper end of the piston rod 213 may be fixedly connected with the frame 1 through the baffle 3. The upper end of the baffle 3 may be provided with the switch 31. The operator may use the switch 31 to make an emergency stop for the electric pallet truck while driving to avoid an accident.

In some embodiments, the outside of the baffle 3 may be provided with the first cover 8 fixed on the frame 1. The outside of the driving mechanism 51 may be provided with a second cover 9. The power supply unit 7 and the hydraulic mechanism 22 may be enclosed by the first cover 8, and isolated from the external environment, which may effectively prevent dust from entering, prolong the service life, and make the structure of the electric pallet truck coordinated and compact. As shown in FIG. 2, in some embodiments, the operating rod 61 of the control unit 6 may be provided with the accelerator 62. The accelerator 62 may be configured as a knob type. The accelerator 62 may be configured to adjust the rotation speed of the second motor 512. The operator may adjust the rotation speed of the second motor 512 through the accelerator 62 to achieve the acceleration or deceleration of the electric pallet truck. In some embodiments, the accelerator 62 may be configured on the operating rod 61 in a knob type, a push button type, a scroll wheel type, a key type, or the like, or any combination thereof.

In some embodiments, the knob type accelerator 62 may be configured on the operating rod 61, so that the operator may push the accelerator by the thumb to control the travel of the electric pallet truck when holding the operating rod. The operation may be convenient. In some embodiments, two accelerators may be arranged symmetrically on the operating rod 61, so that both left and right hands of the operator may control the movement of the electric pallet truck.

The beneficial effects of the embodiments in the present disclosure may include, but are not limited to:

Firstly, by arranging the entire driving mechanism below the lifting mechanism, the overall structure of the electric pallet truck may be compact. Secondly, the transmission of the gear and the gear sleeve may drive the driving wheel to rotate around the outer side of the second motor to realize the movement of the electric pallet truck. This driving way may effectively reduce the overall volume of the driving mechanism, improve the space utilization rate, and make the overall structure of the electric pallet truck compact. Thirdly, the power supply unit may be set as a plug-in type, and the operator may easily assemble and disassemble the box battery. When the box battery is empty, the box battery may be quickly removed and charged without moving the entire electric pallet truck to a charging position for charging. The use efficiency of the electric pallet truck may be improved. Fourthly, by setting the hydraulic mechanism on the same side of the power supply unit, the position of the hydraulic mechanism relative to the power supply unit may be compact, and the power supply line may be shortened. Fifthly, the power supply unit and the hydraulic mechanism may be protected by the first outer cover, which may prevent dust from entering, prolong the service life, and make the structure of the electric pallet truck coordinated and compact. Sixthly, by setting the accelerator on the operating rod, and setting the accelerator as a knob type, the operator may push the accelerator by the thumb to control the traveling speed of the electric pallet truck while holding the operating rod.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. An electric pallet truck, comprising:
a frame;
a lifting unit adjusting a height of the frame; and
a walking unit driving the frame to move; wherein:
the lifting unit includes a lifting mechanism fixedly connected to the frame and a hydraulic mechanism controlling lifting of the lifting mechanism, the walking unit includes a driving mechanism disposed on a bottom of the lifting mechanism;
wherein: the driving mechanism includes a gear transmission unit and a gear box accommodating the gear transmission unit;
the lifting mechanism includes a bearing component;
the gear box is located at a bottom of the bearing component;
the gear transmission unit includes a second motor fixed on the gear box, a drive gear rotatably connected with the second motor, and a gear sleeve rotatably connected with the drive gear;
the gear sleeve is fixedly connected with a driving wheel;
a rotation of the second motor drives a rotation of the drive gear and a rotation of the gear sleeve;
the gear transmission unit includes a shaft gear disposed between the drive gear and the gear sleeve; and
the shaft gear is coaxially disposed with the drive gear and meshes with the gear sleeve;
the gear transmission unit includes a pinion gear disposed between the second motor and the drive gear; and
the pinion gear is sleeved on a motor shaft of the second motor and meshes with the drive gear.

2. The electric pallet truck of claim 1, wherein:
the electric pallet truck includes a power supply unit disposed on an end of the frame; and
the power supply unit is supplying power to at least one of the hydraulic mechanism or the driving mechanism.

3. The electric pallet truck of claim 2, wherein:
the hydraulic mechanism is disposed on the end of the frame, and the hydraulic mechanism is located on the power supply unit.

4. The electric pallet truck of claim 2, wherein:
the power supply unit includes a power connector and a box battery connected to the power connector; and
a connection between the power connector and the box battery is a quick-plug type.

5. The electric pallet truck of claim 4, wherein:
the frame is provided with a mounting part fixing the power connector;
the power connector is provided with a plug component;
the box battery is provided with a power supply port; and
the movement of the box battery relative to the power connector along a first direction can realize a connection and a separation between the plug component and the power supply port.

6. The electric pallet truck of claim 5, wherein:
the mounting part includes a mounting groove disposed on a plate of the frame.

7. The electric pallet truck of claim 1, wherein:
the lifting mechanism includes the bearing component and a cylinder seat fixed on the bearing component; and
an end of a piston rod on the cylinder seat is fixedly connected to the frame.

8. The electric pallet truck of claim 7, wherein:
the hydraulic mechanism includes an oil tank disposed on the frame, a valve group disposed on the oil tank, a first motor configured on the valve group and controlling the valve group, and a relay configured on a side of the first motor; and
the valve group is connected to the piston rod through a lifting oil pipe.

9. The electric pallet truck of claim 1, wherein:
the electric pallet truck includes a link unit connected with the frame and the lifting unit;
the link unit includes a support shaft fixedly disposed on the frame, a first rib and a second rib rotatably disposed on the support shaft;
a first end of the first rib is connected with the lifting unit; and
a first end of the second rib is connected with the frame.

10. The electric pallet truck of claim 9, wherein:
a second end of the first rib is rotatably connected with the bearing component of the lifting mechanism; and
a second end of the second rib is rotatably connected with a push rod of the frame.

11. The electric pallet truck of claim 9, wherein:
the first rib is connected with the second rib through a spacer.

12. The electric pallet truck of claim 1, wherein:
the electric pallet truck includes a control unit connected with the driving mechanism;
an accelerator is configured on an operating rod of the control unit; and
the accelerator is adjusting a rotation rate of the second motor.

13. The electric pallet truck of claim 7, wherein:
a side of the power supply unit is provided with a baffle;
the baffle is fixedly installed on the frame; and
the end of the piston rod is fixedly connected with the baffle.

14. The electric pallet truck of claim 13, wherein:
the frame includes a plate; and
the baffle is fixedly disposed on the plate.

15. The electric pallet truck of claim 13, wherein:
a side of the baffle is provided with a first cover;
the first cover is fixed on the frame; and
a side of the driving mechanism is provided with a second cover.

16. The electric pallet truck of claim 15, wherein:
the electric pallet truck includes a switch; and
the switch is provided on at least one of the baffle, the piston rod, or the first cover.

* * * * *